(12) United States Patent
Nalakath et al.

(10) Patent No.: US 11,075,596 B2
(45) Date of Patent: Jul. 27, 2021

(54) METHOD FOR DETERMINING MOTOR PARAMETERS DURING COMMISSIONING OF SYNCHRONOUS AND ASYNCHRONOUS ELECTRIC MOTORS AND RELATED COMMISSIONED ELECTRIC MOTOR

(71) Applicant: BorgWarner Inc., Auburn Hills, MI (US)

(72) Inventors: Shamsuddeen Nalakath, Hamilton Ontario (CA); Parisa Mahvelatishamsabadi, Hamilton Ontario (CA); Jing Zhao, Hamilton Ontario (CA); Ali Emadi, Hamilton Ontario (CA); Yingguang Sun, Kitchener Ontario (CA); Jason Wiseman, Kitchener Ontario (CA)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/865,750

(22) Filed: May 4, 2020

(65) Prior Publication Data

US 2020/0358385 A1  Nov. 12, 2020

Related U.S. Application Data

(60) Provisional application No. 62/844,774, filed on May 8, 2019.

(51) Int. Cl.
*H02P 21/08*  (2016.01)
*H02P 21/22*  (2016.01)
*H02P 21/16*  (2016.01)

(52) U.S. Cl.
CPC .............. *H02P 21/08* (2013.01); *H02P 21/16* (2016.02); *H02P 21/22* (2016.02)

(58) Field of Classification Search
USPC ........................................................ 318/560
See application file for complete search history.

(56) References Cited

U.S. PATENT DOCUMENTS

| 4,310,791 | A | * | 1/1982 | Akamatsu | ............... | H02P 23/08 |
| | | | | | | 318/800 |
| 5,245,257 | A | * | 9/1993 | Tobise | .................... | B21B 37/52 |
| | | | | | | 318/255 |
| 5,388,052 | A | | 2/1995 | Mann | | |
| 5,861,728 | A | | 1/1999 | Tazawa et al. | | |
| 5,880,415 | A | | 3/1999 | Colby et al. | | |
| 5,883,344 | A | | 3/1999 | Colby et al. | | |

(Continued)

FOREIGN PATENT DOCUMENTS

JP  2000312498  11/2000

*Primary Examiner* — Bentsu Ro
(74) *Attorney, Agent, or Firm* — Burris Law, PLLC

(57) ABSTRACT

A method for commissioning a synchronous or asynchronous electric motor having a stator and a rotor in which electrical power is applied to the motor when the rotor is stationary. The electric power is applied in two stages. The first stage utilizes a DC power that ramps in voltage over the duration of the first test to produce a current response that is employed to determine at least a first motor parameter. The second stage uses relatively high frequency AC power to generate one or more current responses that are employed to determine second and third motor parameters. A related electric motor drive system is also provided.

16 Claims, 10 Drawing Sheets

(56) References Cited

U.S. PATENT DOCUMENTS

| | | | |
|---|---|---|---|
| 5,929,400 A | 7/1999 | Colby et al. | |
| 6,285,961 B1 | 9/2001 | Jahkonen et al. | |
| 6,720,748 B1 | 4/2004 | Seibel et al. | |
| 6,850,031 B2 * | 2/2005 | Nakata | H02P 6/06 318/801 |
| 8,384,338 B2 | 2/2013 | Lu et al. | |
| 8,483,981 B2 | 7/2013 | Heikkila | |
| 8,587,239 B2 | 11/2013 | Villwock et al. | |
| 9,379,654 B2 | 6/2016 | Peretti et al. | |
| 10,050,571 B2 | 8/2018 | Jang | |
| 2002/0153857 A1 * | 10/2002 | Iwaji | H02P 21/24 318/700 |
| 2006/0044711 A1 | 3/2006 | Wiseman | |
| 2006/0097596 A1 | 5/2006 | Desai et al. | |
| 2006/0238158 A1 | 10/2006 | Emadi et al. | |
| 2008/0007886 A1 | 1/2008 | Wiseman | |
| 2008/0013348 A1 | 1/2008 | Wiseman | |
| 2008/0042613 A1 * | 2/2008 | Aizawa | H02P 21/34 318/778 |
| 2008/0079378 A1 | 4/2008 | Nakatsugawa et al. | |
| 2008/0180055 A1 | 7/2008 | Zargari et al. | |
| 2009/0009113 A1 | 1/2009 | Rodriguez et al. | |
| 2009/0103341 A1 | 4/2009 | Lee et al. | |
| 2009/0198396 A1 | 8/2009 | Rodriguez et al. | |
| 2009/0223725 A1 | 9/2009 | Rodriguez et al. | |
| 2009/0248230 A1 * | 10/2009 | Izumi | H02P 23/0004 701/22 |
| 2010/0000807 A1 | 1/2010 | Rodriguez et al. | |
| 2010/0060210 A1 | 3/2010 | Liu et al. | |
| 2011/0248582 A1 | 10/2011 | Desai et al. | |
| 2013/0252773 A1 | 9/2013 | Suntharalingam et al. | |
| 2013/0252774 A1 | 9/2013 | Suntharalingam et al. | |
| 2013/0252783 A1 | 9/2013 | Suntharalingam et al. | |
| 2014/0111038 A1 | 4/2014 | Yang et al. | |
| 2014/0288750 A1 | 9/2014 | Lankin et al. | |
| 2015/0162863 A1 | 6/2015 | Emadi et al. | |
| 2015/0207439 A1 | 7/2015 | Ye et al. | |
| 2015/0280626 A1 | 10/2015 | Ye et al. | |
| 2017/0117784 A1 | 4/2017 | Guo et al. | |
| 2018/0076765 A1 | 3/2018 | Taghivand et al. | |
| 2018/0083519 A1 | 3/2018 | Suntharalingam et al. | |
| 2018/0083661 A1 | 3/2018 | Emadi et al. | |
| 2018/0111599 A1 | 4/2018 | Wang et al. | |
| 2018/0131261 A1 | 5/2018 | Bilgin et al. | |
| 2018/0131397 A1 | 5/2018 | Emadi et al. | |
| 2018/0138792 A1 | 5/2018 | Bilgin et al. | |
| 2018/0287473 A1 | 10/2018 | Bilgin et al. | |
| 2019/0101454 A1 | 4/2019 | Bhat et al. | |
| 2019/0111804 A1 | 4/2019 | Hellinga et al. | |
| 2019/0148998 A1 | 5/2019 | Oner et al. | |
| 2019/0157953 A1 | 5/2019 | Oner et al. | |
| 2019/0190364 A1 | 6/2019 | Oner et al. | |
| 2019/0389505 A1 | 12/2019 | Pramod et al. | |
| 2020/0036314 A1 | 1/2020 | Li et al. | |
| 2020/0041628 A1 | 2/2020 | Emadi et al. | |
| 2020/0161949 A1 | 5/2020 | Oner et al. | |

* cited by examiner

METHOD FOR DETERMINING MOTOR PARAMETERS DURING COMMISSIONING OF SYNCHRONOUS AND ASYNCHRONOUS ELECTRIC MOTORS AND RELATED COMMISSIONED ELECTRIC MOTOR

CROSS-REFERENCE TO RELATED APPLICATIONS

This application claims the benefit of U.S. Provisional Patent Application No. 62/844,774 filed May 8, 2019, the disclosure of which is incorporated by reference as if fully set forth in detail herein.

FIELD

The present disclosure relates to a method for determining motor parameters during commissioning of synchronous and asynchronous electric motors and related commissioned electric motors.

BACKGROUND

This section provides background information related to the present disclosure which is not necessarily prior art.

Electric motor drive systems are widely employed in consumer products, process automation, automobiles, and aircraft, for example, and typically include an electric motor and a controller unit that is comprised of a power converter, control hardware, and control program. The control program requires the values of various motor parameters in order to achieve the desired control performances. These motor parameters are quantified and programmed into the control unit as a part of a motor commissioning process.

The motor commissioning process can be treated as though it were a one-time task for a chosen or given electric motor drive system and can be performed manually by technicians in a laboratory with the help of special equipment and instruments. Such manual commissioning, however, can have several drawbacks. For example, it is not uncommon for the motor parameters of a newly manufactured electric motor to vary over time. Consequently, one or more of the motor parameters can vary not only between batches of a given motor, but also within a batch of the given motor. Such variances can be important for the efficient operation of the motor, particularly in high-performance applications. Manual commissioning of multiple motors within a batch of a given motor, or even of a motor from every batch of a given motor, is not a practical solution as the process is laborious and involves high overhead cost. In situations where the production volume of a given electric motor is relatively low, the costs of manual commissioning are amortized over a relatively small quantity of electric motors, which has the effect of significantly increasing the cost of the electric motor. Furthermore, manual commissioning in the field can be difficult (e.g., due to constraints on the space that is available for the technician and the specialized equipment) and can be less accurate than may be desired, for example due to elevated environmental temperatures.

In view of the drawbacks associated with manual commissioning, there is a preference in the art for self-commissioning processes in which relevant motor parameters are determined automatically through an algorithm that is implemented in the control program that is implemented in the control hardware. Some self-commissioning process are undertaken when the rotor of the electric motor is rotating, and other self-commissioning processes are undertaken when the rotor is stationary (i.e., not rotating).

Some of the known self-commissioning processes are based on the types of steady-state tests that are conducted in manual commissioning processes and are not desirable due to their requirement for additional instruments and special setups of the type that would more commonly be employed in a laboratory. Other known self-commissioning processes calculate various parameters based on manufacture information typically found on the nameplate of an electric motor and lack accuracy. Moreover, the motor parameter estimation techniques employed in many of the known self-commissioning processes are either based on frequency or time domain analyses. In these techniques, AC voltages at different frequencies and step voltages are respectively applied to obtain frequency and time domain responses. These techniques involve heavy post-processing, for example, spectral analysis and curve fitting to determine the motor parameters.

SUMMARY

This section provides a general summary of the disclosure, and is not a comprehensive disclosure of its full scope or all of its features.

In one form, the present disclosure provides a method for commissioning an electric motor having a stator and a rotor. The electric motor is either a synchronous electric motor or an asynchronous electric motor. The method includes: with the rotor in a non-rotating condition relative to the stator, applying a first test voltage signal ($v_{ds}$) to the direct axis (d) of the stator and responsively measuring a first response current ($i_{ds}$) on the direct axis (d) of the stator, wherein the first test voltage signal ($v_{ds}$) is a direct current signal that continuously increases between a first voltage ($v_0$) and a second voltage ($v_{max}$); determining at least a first motor parameter based on the first response current ($i_{ds}$); with the rotor in a non-rotating condition relative to the stator, applying a second test voltage signal ($v_{ds}$) to either a) the direct axis (d) of the stator or b) both the direct axis (d) and the quadrature axis (q) of the stator, and responsively measuring second and third response currents ($i_{ds}$ and $i_{qs}$) on the direct and quadrature axes (d and q), respectively, of the stator, wherein the second test voltage signal ($v_{ds}$) has a non-zero frequency (f) and an amplitude (A); and determining second and third motor parameters based on at least one of the second and third response currents ($i_{ds}$ and $i_{qs}$).

In another form, the present disclosure provides an electric motor drive system that includes an electric motor and a control unit. The electric motor is a synchronous or asynchronous motor and has a stator and a rotor. The control unit has a power converter, control hardware and a control program that is executed by the control hardware. The control program is programmed to operate a self-commissioning algorithm that includes: applying a first test voltage signal ($v_{ds}$) to the direct axis (d) of the stator and responsively measuring a first response current ($i_{ds}$) on the direct axis (d) of the stator with the rotor in a non-rotating condition relative to the stator, wherein the first test voltage signal ($v_{ds}$) is a direct current signal that continuously increases between a first voltage ($v_0$) and a second voltage ($v_{max}$); determining at least a first motor parameter based on the first response current ($i_{ds}$); applying a second test voltage signal ($v_{ds}$) to either a) the direct axis (d) of the stator or b) both the direct axis (d) and the quadrature axis (q) of the stator when the rotor is in a non-rotating condition relative to the stator, and responsively measuring second and third response currents ($i_{ds}$ and $i_{qs}$) on the direct and quadrature axes (d and q), respectively, of the stator, wherein the second test voltage signal ($v_{ds}$) has a non-zero frequency (f) and an amplitude (A); and determining second and third motor parameters based on at least one of the second and third response currents ($i_{ds}$ and $i_{qs}$).

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 5:
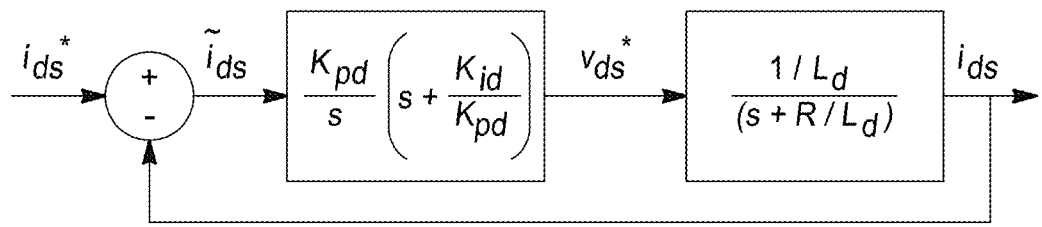
Figure 6:
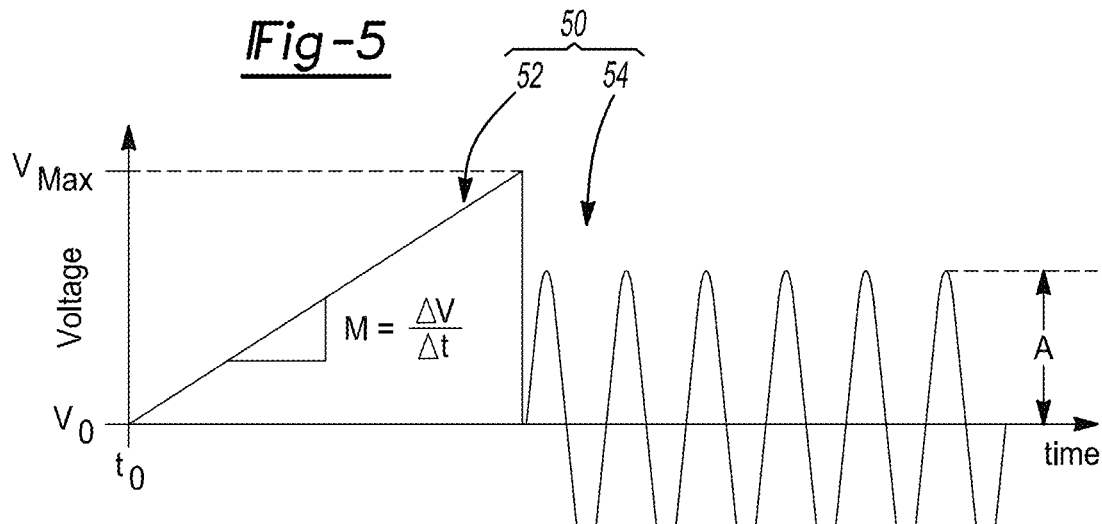
Figure 7A:
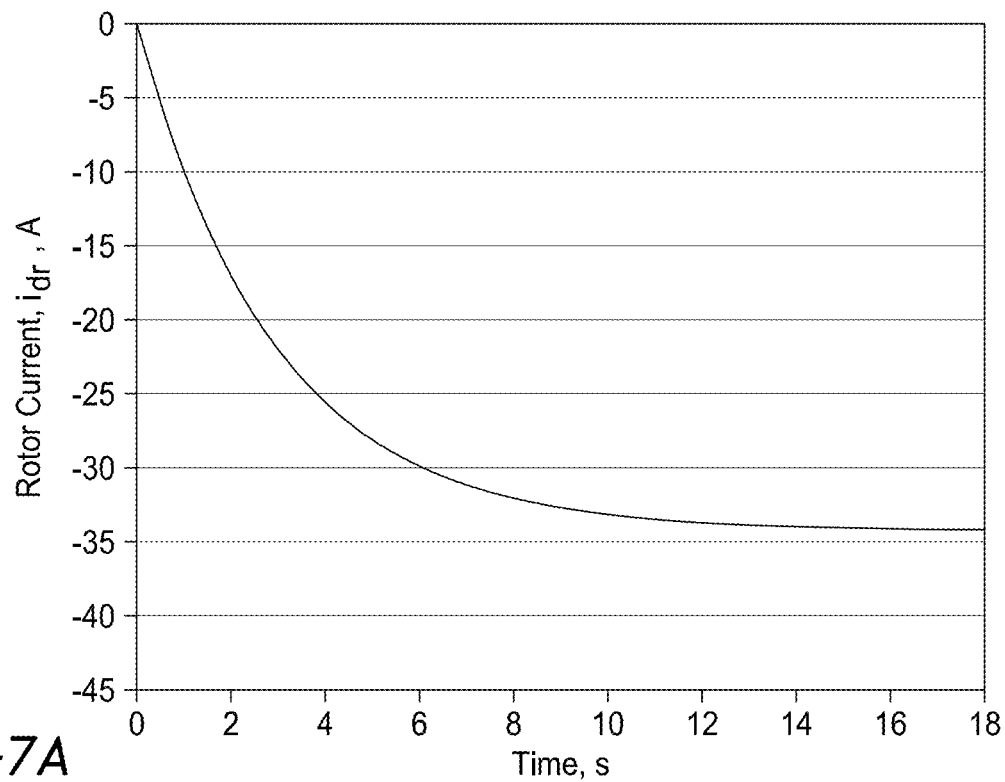
Figure 7B:
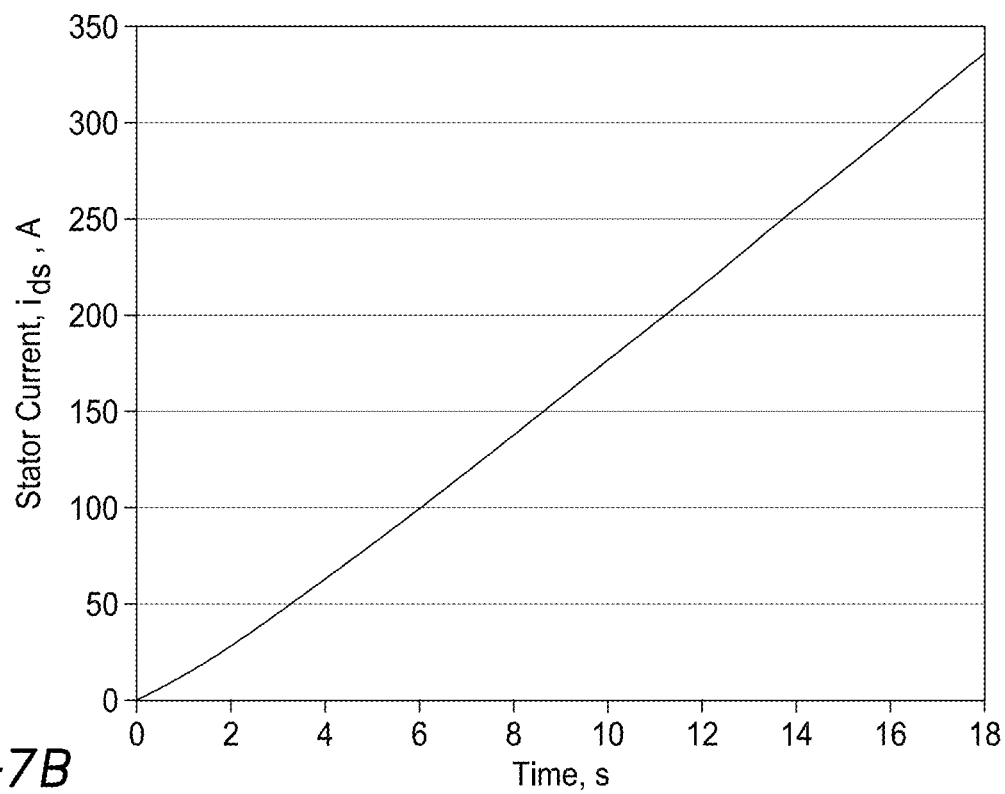
Figure 8:
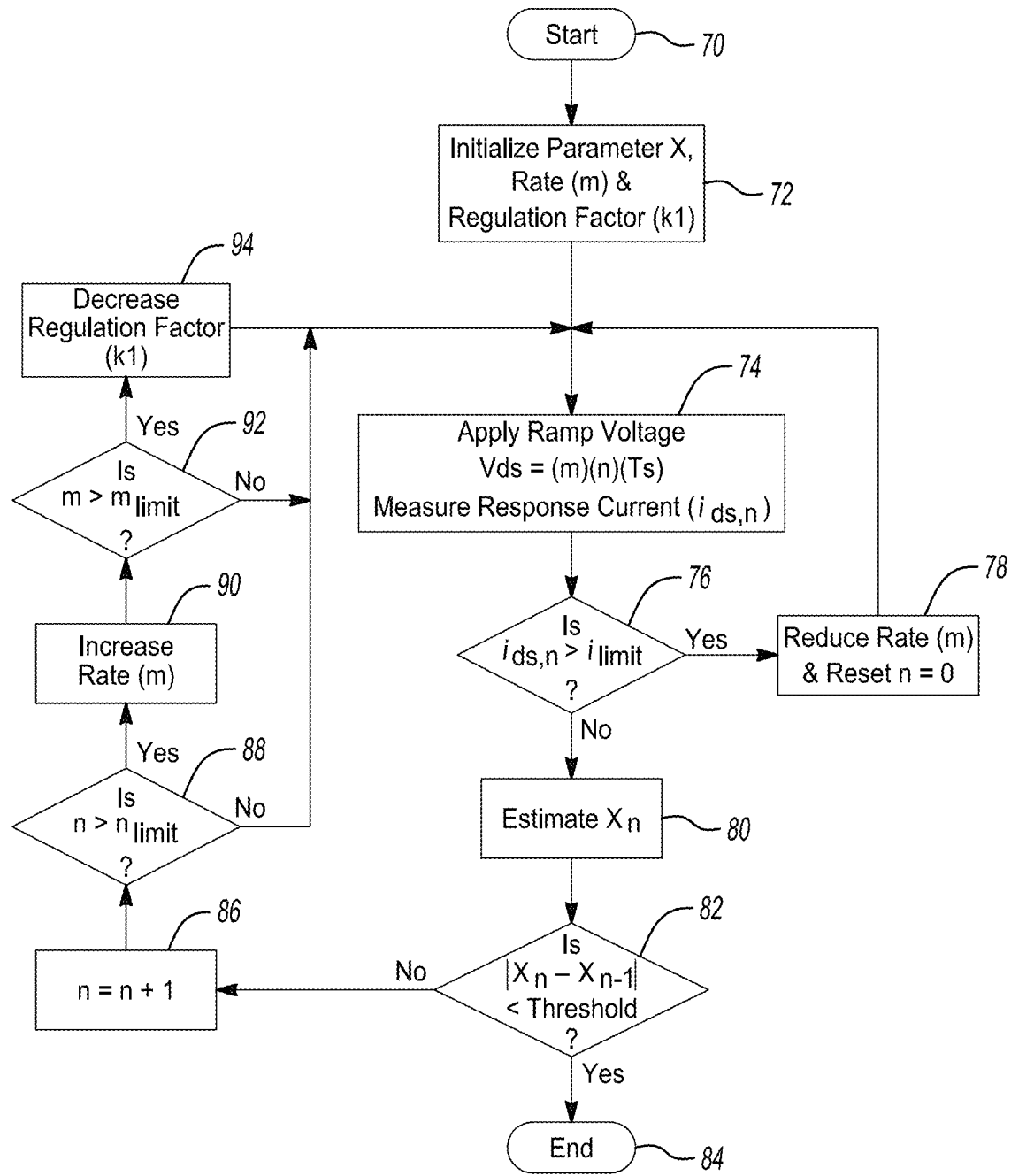
Figure 9:
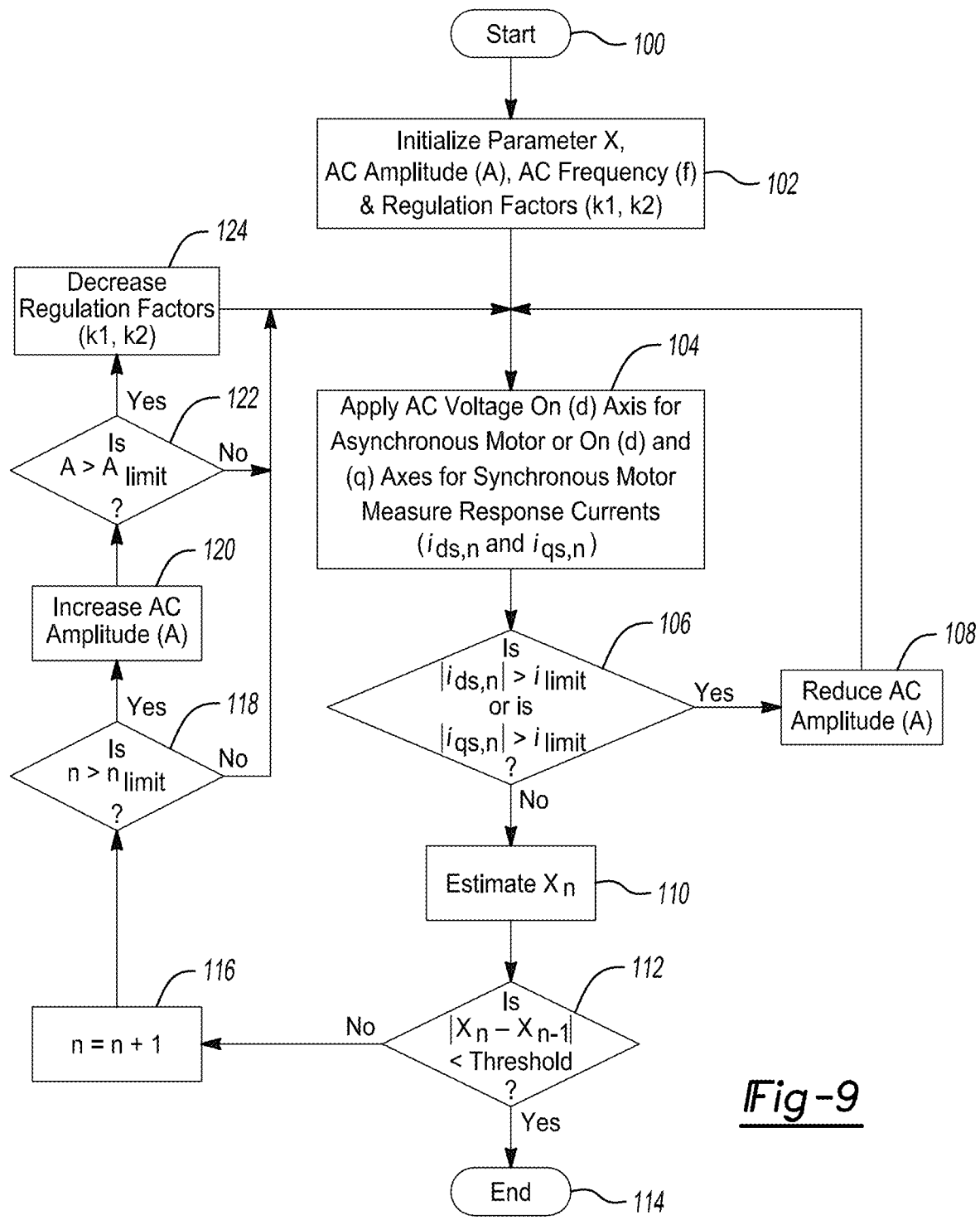
Figure 10A:
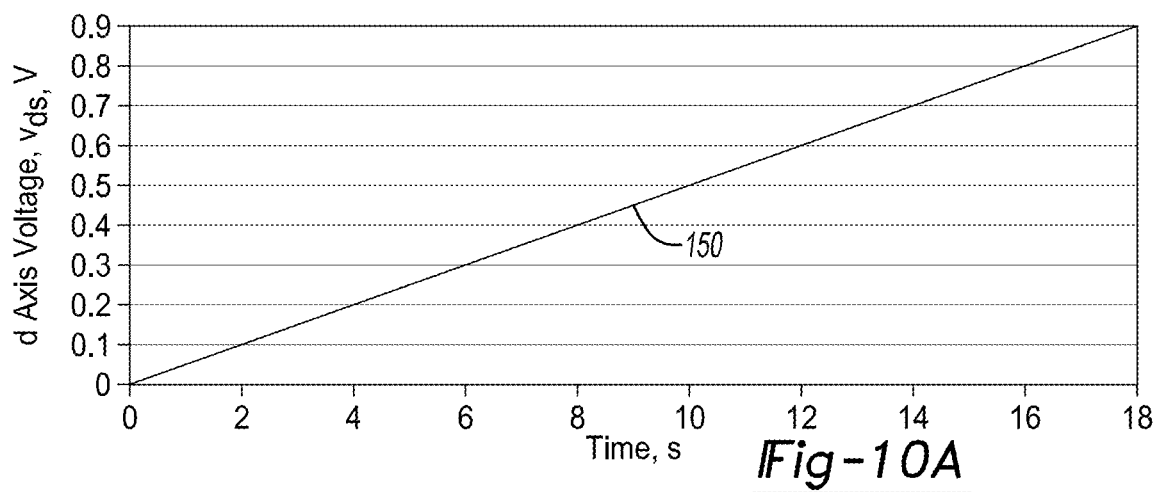
Figure 10B:
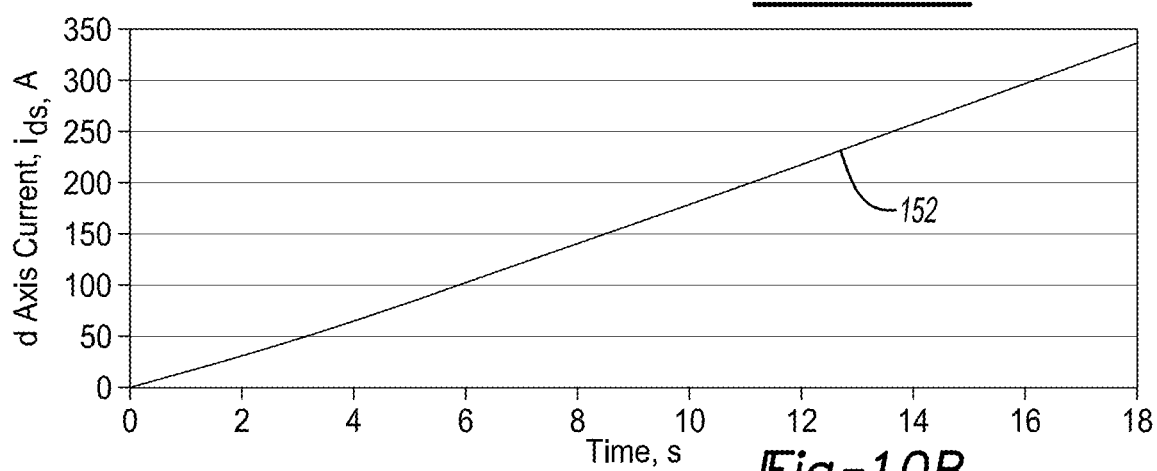
Figure 10C:
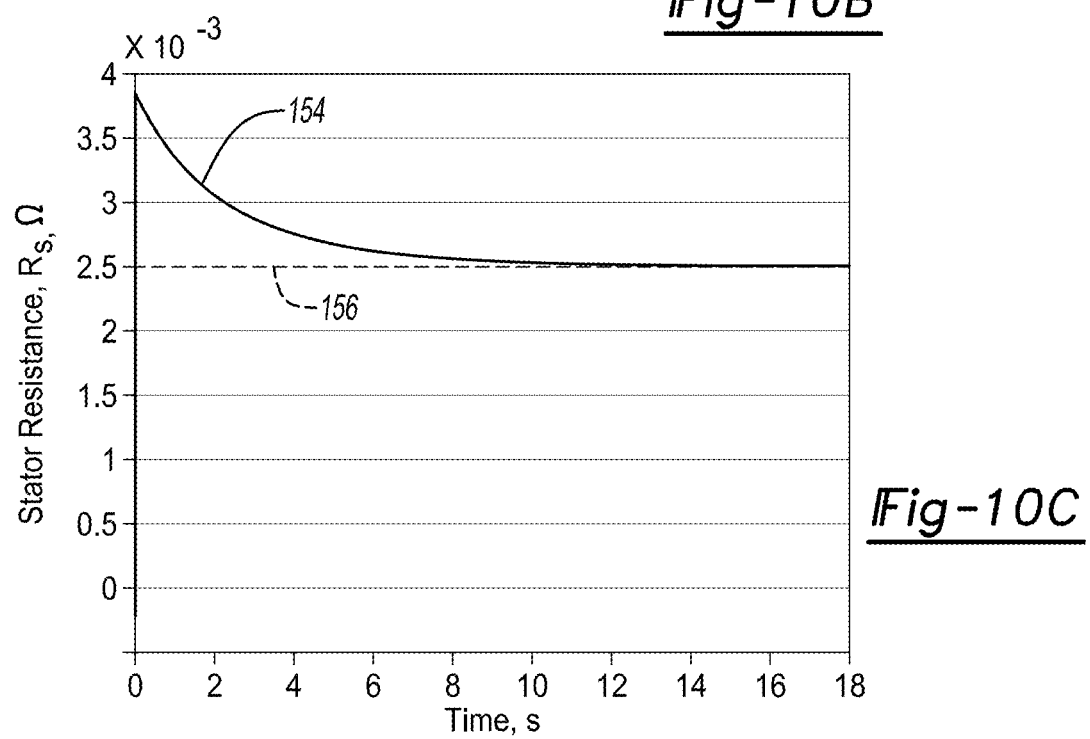
Figure 10D:
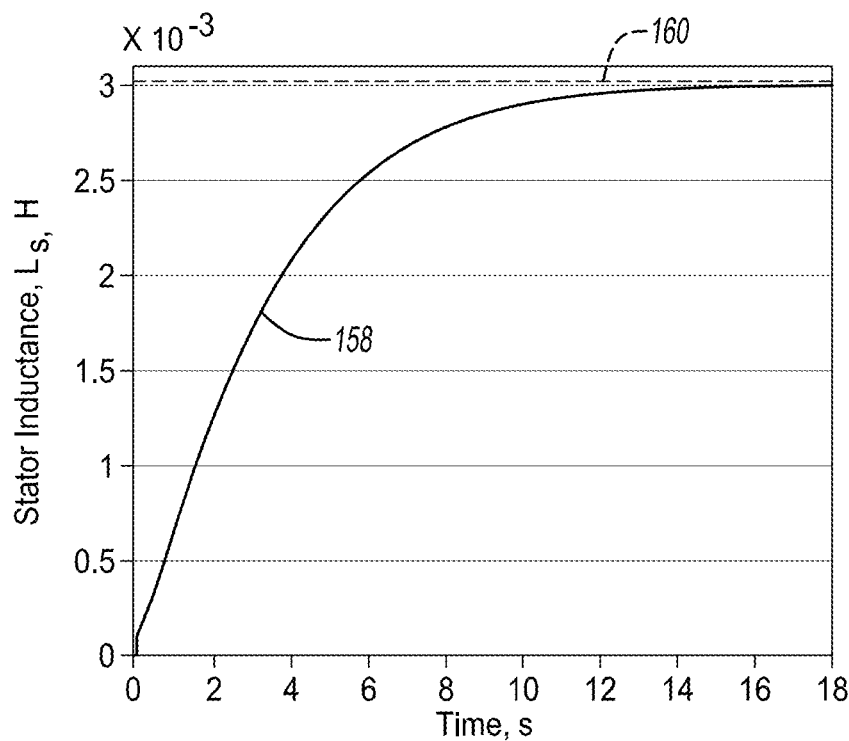
Figure 10E:
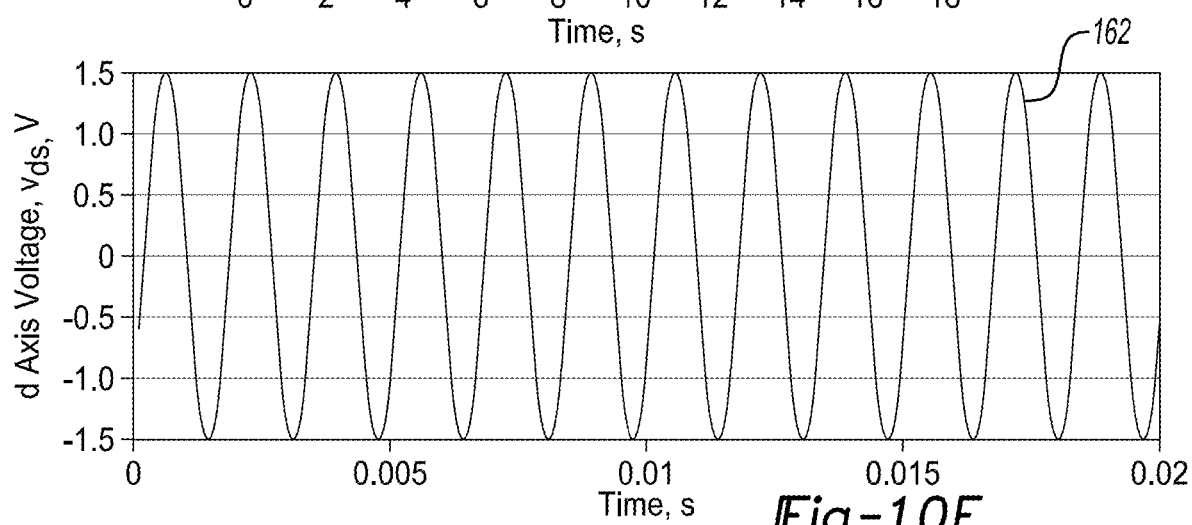
Figure 10F:
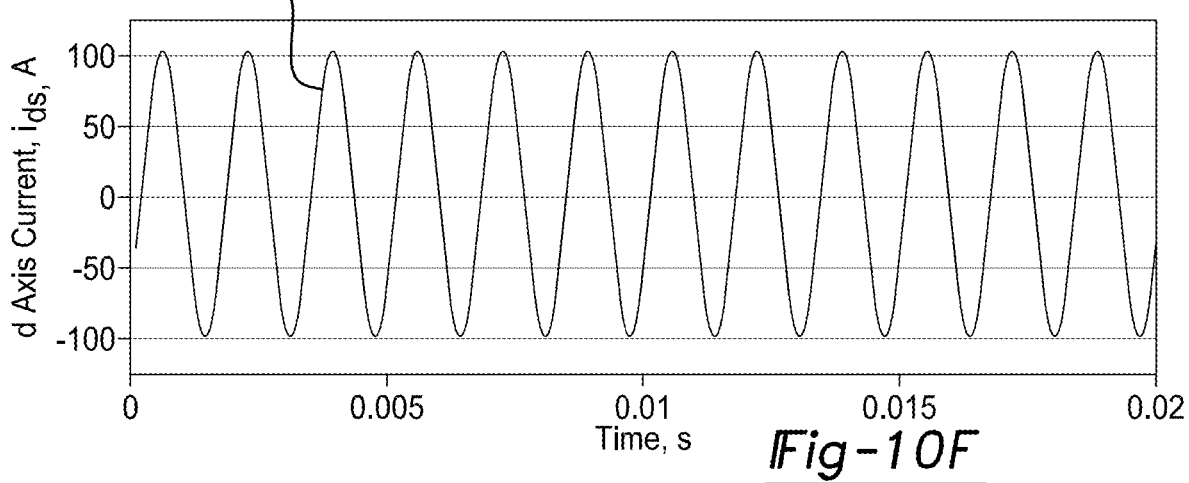
Figure 10G:
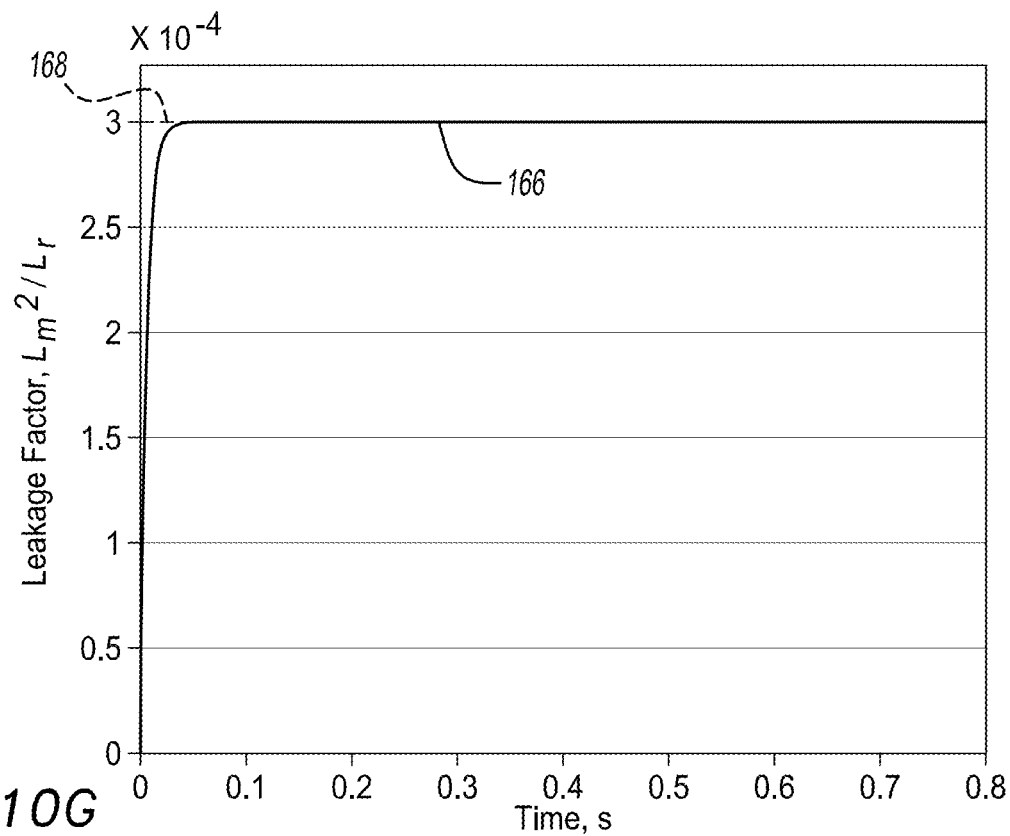
Figure 10H:
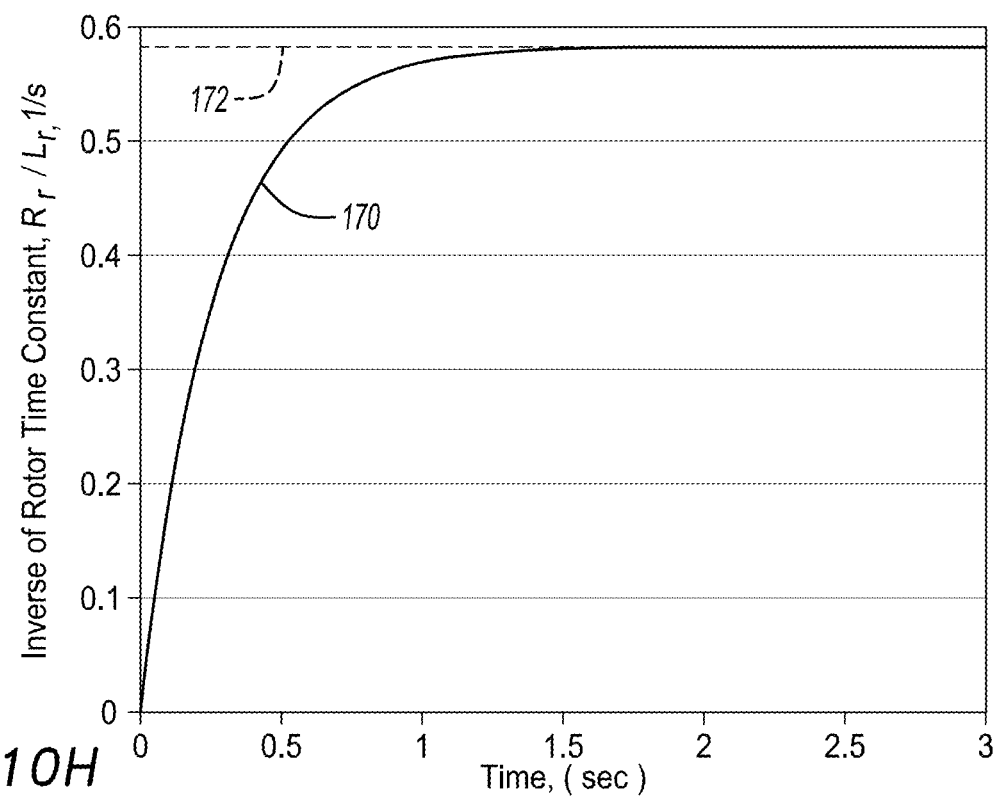
Figure 11A:
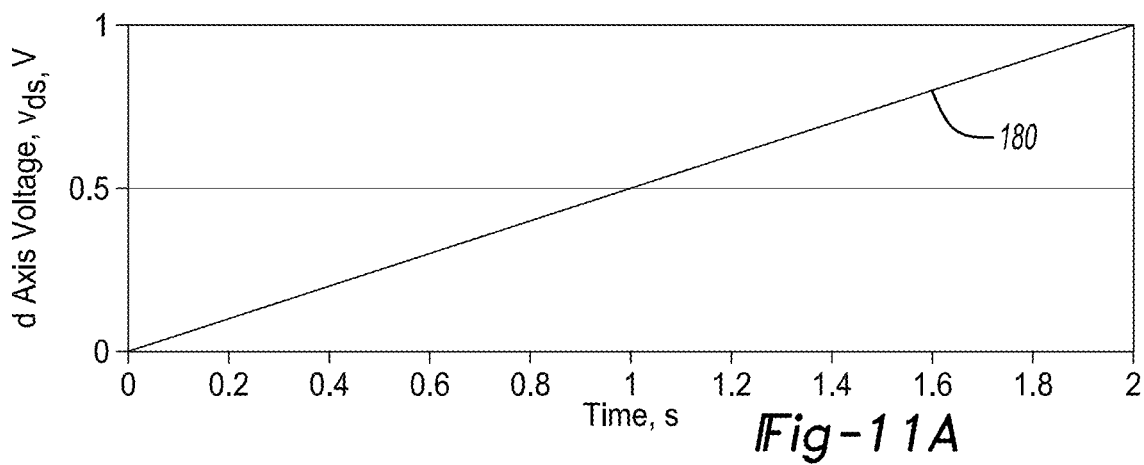
Figure 11B:
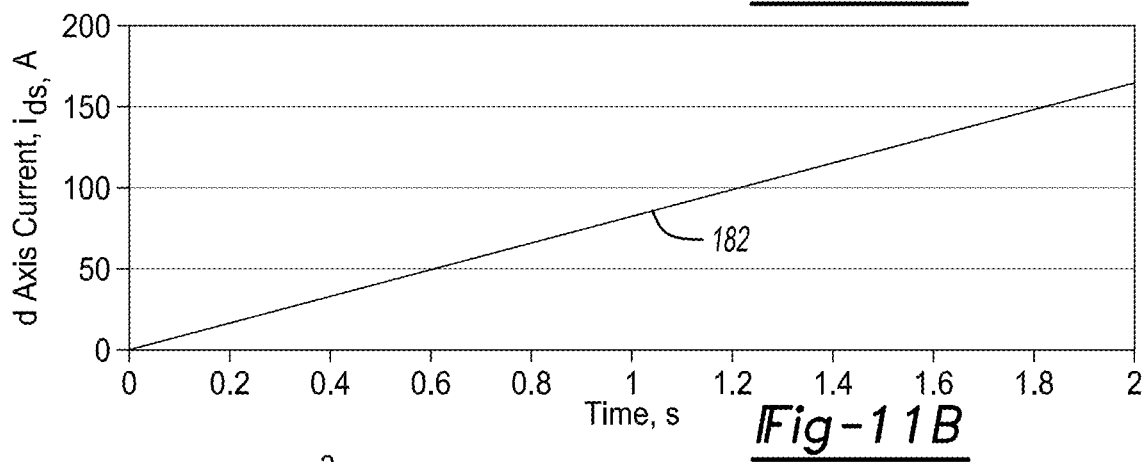
Figure 11C:
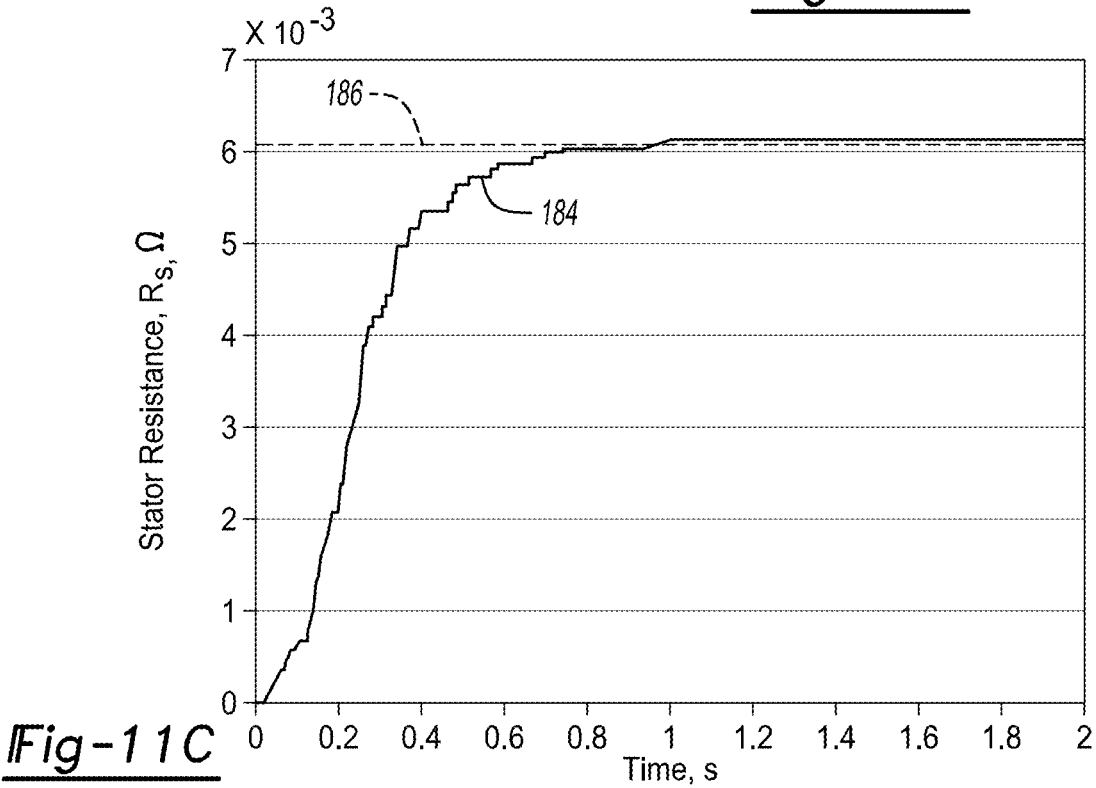
Figure 11D:
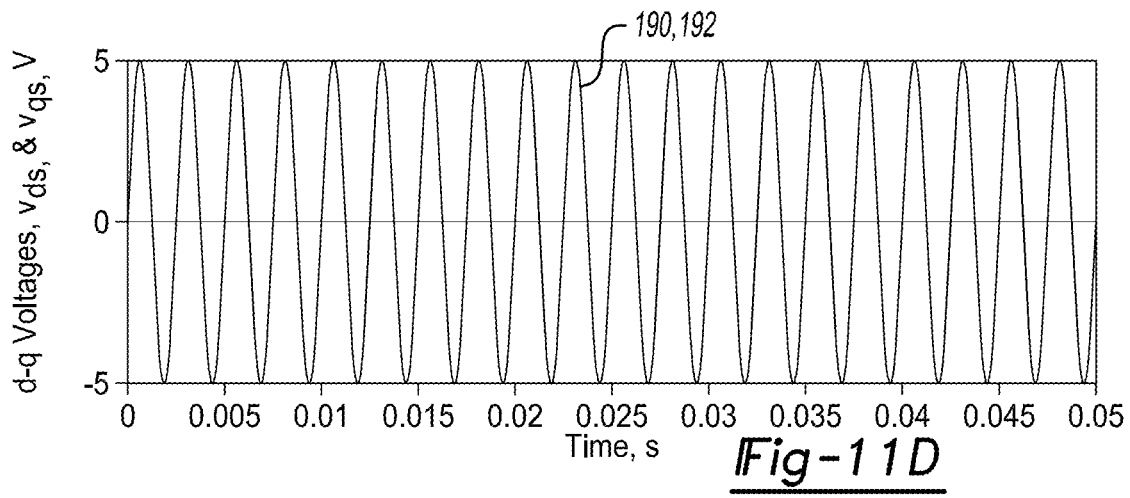
Figure 11E:
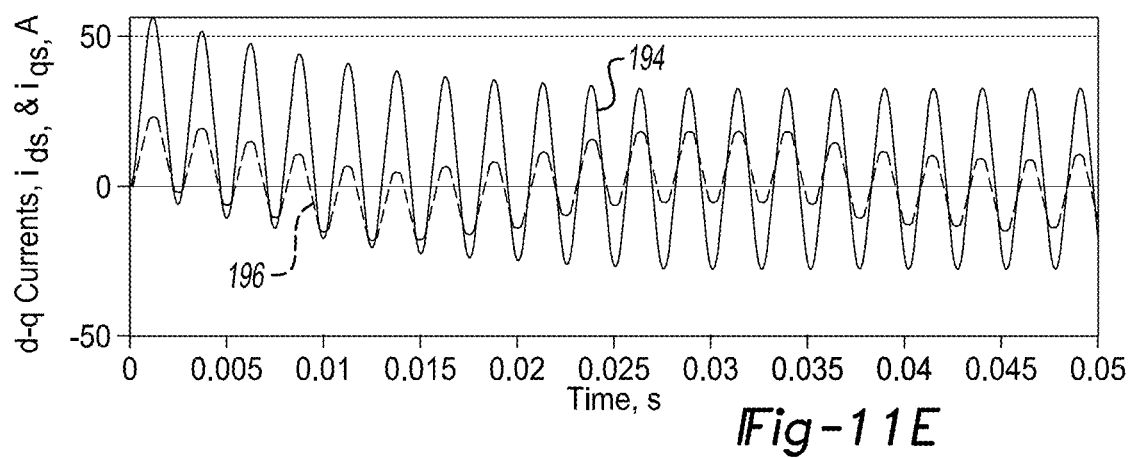
Figure 11F:
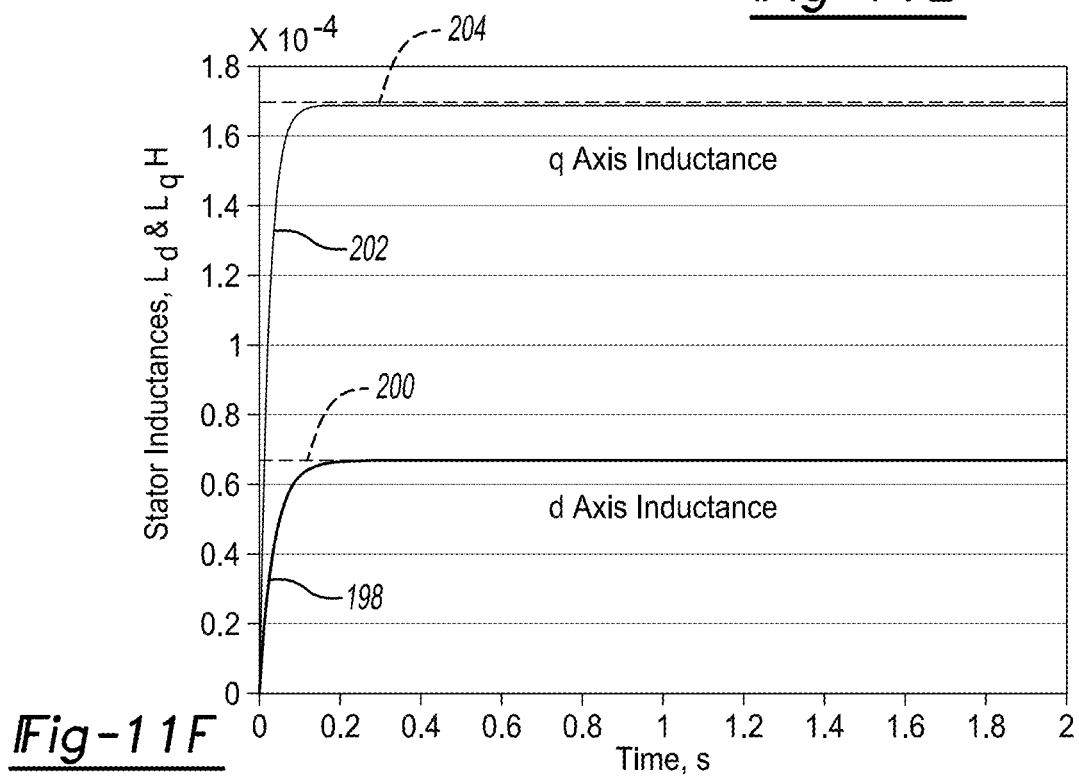

FIG. 5 a block diagram of a closed loop system with a linear current controller;

FIG. 6 is a plot that illustrates a test voltage profile that is employed to perform a motor commissioning function in accordance with the teachings of the present disclosure;

FIGS. 7A and 7B are plots showing simulated results for current on the direct axis (d) of the rotor and the stator, respectively, that are generated in response to the application of the test voltage profile onto the direct axis (d);

FIG. 8 is a schematic view in flowchart form of an estimating technique for estimating at least a first parameter for an electric motor in accordance with the teachings of the present disclosure;

FIG. 9 is a schematic view in flowchart form of an estimating technique for estimating at least second and third parameters for an electric motor in accordance with the teachings of the present disclosure;

FIG. 10A is a plot for an asynchronous motor showing the test voltage of a DC profile portion of a commissioning process performed in accordance with the teachings of the present disclosure;

FIG. 10B is a plot for an asynchronous motor showing a response current on the direct axis (d) of the stator that is generated in response to the test voltage of the DC profile portion of the commissioning process;

FIG. 10C is a plot for an asynchronous motor showing a resistance of the stator during the DC profile portion of the commissioning process;

FIG. 10D is a plot for an asynchronous motor showing an inductance of the stator during the DC profile portion of the commissioning process;

FIG. 10E is a plot for an asynchronous motor showing the test voltage of an AC profile portion of a commissioning process performed in accordance with the teachings of the present disclosure;

FIG. 10F is a plot for an asynchronous motor showing a response current on the direct axis (d) of the stator that is generated in response to the test voltage of the AC profile portion of the commissioning process;

FIGS. 10G and 10H are plots for an asynchronous motor showing a leakage factor and an inverse of a rotor time constant that is generated in response to the test voltage of the AC profile portion of the commissioning process;

FIG. 11A is a plot for a synchronous motor showing the test voltage of a DC profile portion of a commissioning process performed in accordance with the teachings of the present disclosure;

FIG. 11B is a plot for a synchronous motor showing a response current on the direct axis (d) of the stator that is generated in response to the test voltage of the DC profile portion of the commissioning process;

FIG. 11C is a plot for a synchronous motor showing a resistance of the stator during the DC profile portion of the commissioning process;

FIG. 11D is a plot for a synchronous motor showing the test voltage of an AC profile portion of a commissioning process performed in accordance with the teachings of the present disclosure;

FIG. 11E are plots for a synchronous motor showing a response current on the direct axis (d) and the quadrature axis (q) that is generated in response to the test voltage of the AC profile portion of the commissioning process; and FIG. 11F are plots for a synchronous motor showing inductances on the direct axis (d) and the quadrature axis (q) that are generated in response to the test voltage of the AC profile portion of the commissioning process.

Corresponding reference numerals indicate corresponding parts throughout the several views of the drawings.

DETAILED DESCRIPTION

Figure 1:
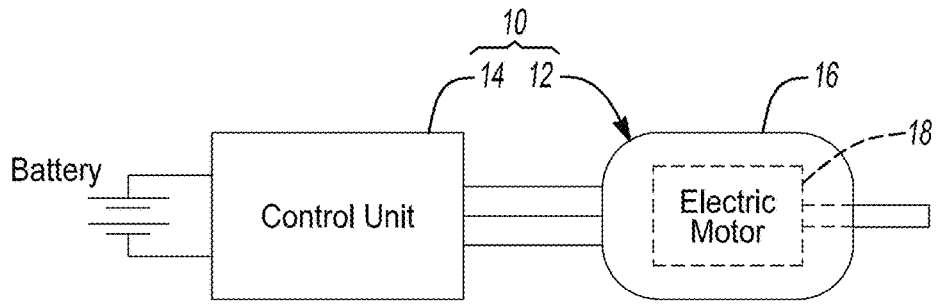
FIG. 1 is a schematic illustration of an exemplary electric motor drive system constructed in accordance with the teachings of the present disclosure.

With reference to FIG. 1, an exemplary electric motor drive system constructed in accordance with the teachings of the present disclosure is generally indicated by reference numeral 10 and can include an electric motor 12 and a control unit 14. The electric motor 12 can be a conventional synchronous or asynchronous motor and has a stator 16 and a rotor 18 that is rotatable relative to the stator 16. The control unit 14 includes a conventional power converter (not specifically shown), conventional control hardware (not specifically shown), and a control program that is configured to determine motor parameters during the commissioning of the electric motor 12 in accordance with the teachings of the present disclosure and which is implemented on the control hardware. The control hardware includes a controller, such as a digital signal processor or a microcontroller, which has the capability of processing the control program, as well as gate drivers, a resolver or encoder, a CAN interface, current sensors and voltage sensors. The control hardware operates with the power converter and the control program to transform or convert user-generated motor commands into electric power signals that are transmitted to the electric motor 12 to cause the rotor 18 to rotate.

Figure 2:
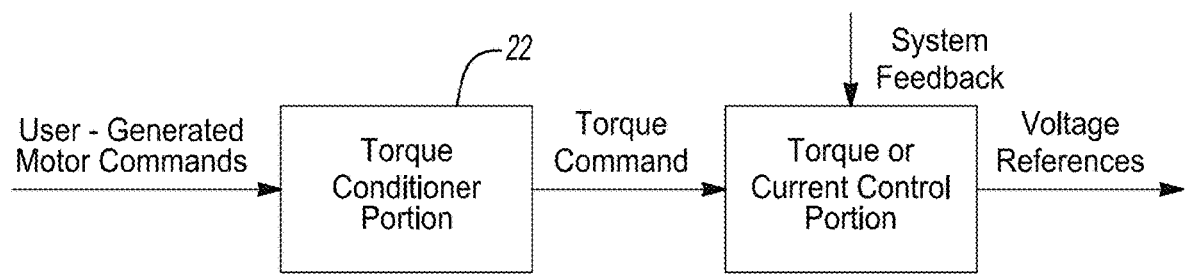
FIG. 2 is a schematic illustration of a portion of the electric motor drive system that illustrates a control program in more detail.

With reference to FIG. 2, the control program is schematically illustrated as including a torque conditioner portion 20 and a torque or current control portion 22. The torque conditioner portion 20 is configured to process the user-generated motor commands into a torque command that is output to the torque or current control portion 22. In a simplified form, the torque conditioner portion 20 is a linear speed controller that compares the rotational speed of the rotor 18 (FIG. 1) to a reference speed and responsively generates the torque command. In a more advanced form, the torque conditioner portion 20 can be a utilize a mix of lookup tables, linear control, and estimates and can generate the torque command through an algorithm that considers additional factors, such as DC link voltage fluctuations, motor and power converter temperature rise, and the limits on torque, its slew rate, and current. The torque or current control portion 22 can be configured to provide linear control, direct torque control or model predictive control for example and as such, the structure of the torque or current control portion 22 can vary accordingly. If the torque or current control portion 22 utilizes current control, the torque or current control portion 22 converts the torque command into a current command. Significantly, the load and various mechanical and electrical properties of the electric motor 12 (FIG. 1) are required to properly configure the torque or current control portion 22.

The control program is also configured to estimate various parameters of the electric motor 12 (FIG. 1) as part of a self-commissioning process during which the rotor 18 (FIG. 1) of the electric motor 12 (FIG. 1) is maintained in a stationary, non-rotating (i.e., standstill) condition. Calibration of current measurements, voltage measurements, various sensors and inverter nonlinearities are one-time tasks that are assumed to have been carried out prior to estimating the various motor parameters. These motor parameters are required to realize or tune the torque or current control portion 22. For example, if the torque or current control portion 22 is a linear current controller, then the motor parameters include the stator resistance ($R_s$) and direct and quadrature axes (d and q) inductances ($L_d$ and $L_q$) for both synchronous and asynchronous motors as will be explained in more detail below. Other controller types additionally require information of the field flux linkage ($\psi_f$), but this parameter is only observable when the rotor 18 (FIG. 1) is rotating. Rotation of the rotor (FIG. 1) complicates the self-commissioning process especially if the electric motor 12 (FIG. 1) is connected to a load. However, once the linear current controller is tuned with the parameter information from the estimation with the rotor 18 at standstill, one can confidently operate the electric motor 12 (FIG. 1) to rotate the rotor 18 (FIG. 1) and estimate the field flux linkage ($\psi_f$).

Linear Current Controller

Figure 3:
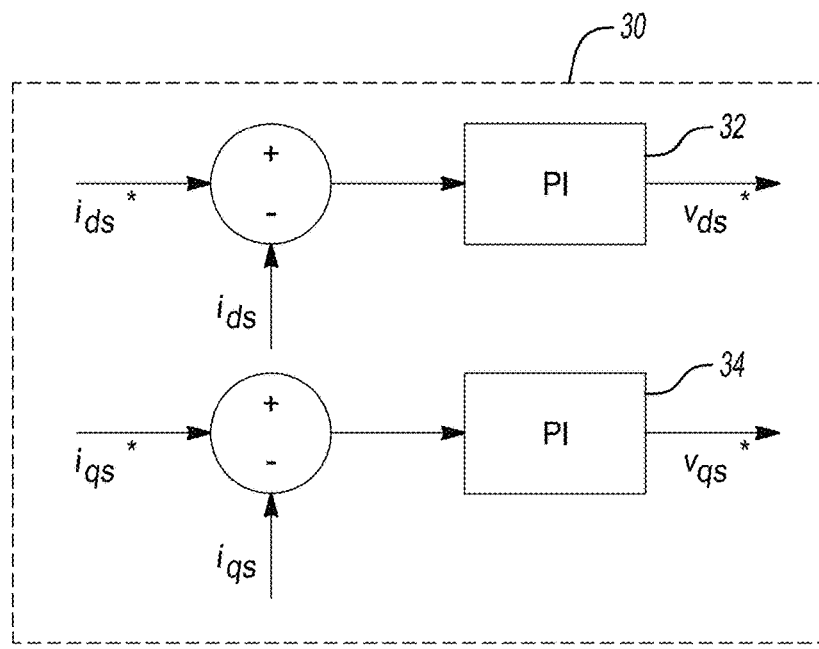
FIG. 3 is a block diagram of a linear controller.

With reference to FIG. 3, the structure of a typical linear controller 30 is schematically illustrated. The linear controller 30 is of a type that is widely employed for field oriented control (FOC) and includes a first linear proportional-integral controller 32 for current ($i_{ds}$) on the direct axis (d) and a second linear proportional-integral controller 34 for current ($i_{qs}$) on the quadrature axis (q). The transfer functions of these controllers are:

$$\frac{\tilde{i}_{ds}}{v_{ds}^*} = \frac{K_{pd}\left(s + \frac{K_{id}}{K_{pd}}\right)}{s} \quad (1)$$

$$\frac{\tilde{i}_{qs}}{v_{qs}^*} = \frac{K_{pq}\left(s + \frac{K_{iq}}{K_{pq}}\right)}{s} \quad (2)$$

where $\tilde{i}_{ds}$ and $\tilde{i}_{qs}$ are the error between reference ($i^*_{ds}$ and $i^*_{qs}$) and feedback ($i_{ds}$ and $i_{qs}$) stator currents and they are expressed as $$\tilde{i}_{ds} = i^*_{ds} - i_{ds}, \quad (3)$$

$$\tilde{i}_{qs} = i^*_{qs} - i_{qs}, \quad (4)$$

$K_{pd}$ and $K_{id}$ are respectively the proportional and integral gain of the d axis, and $K_{pq}$ and $K_{iq}$ are the q axis counterparts.

The d and q model equations corresponding to stator side of synchronous and asynchronous motors are $$v_{ds} = i_{ds}R + L_d\frac{di_d}{dt} - \omega L_q i_{qs}, \quad (5)$$

$$v_{qs} = i_{qs}R_s + L_q\frac{di_{qs}}{dt} + \omega L_d i_{ds} + \omega \psi_f, \quad (6)$$

where $v_{ds}$ and $v_{qs}$ are d and q axes stator voltages, and $\omega$ is the synchronous electrical frequency. For asynchronous motors, $\psi_f=0$. It is either permanent magnet or field winding flux linkage for the synchronous motors. The model equations (5) and (6) are trivial for the synchronous motors. However, for the asynchronous machines, the rotor field orientation and rotor steady state conditions are required to be met to arrive at the above equations. The field orientation condition is rotor q axis flux linkage $\psi_{qr}=0$, and the rotor steady state conditions are the d axis rotor current $i_{dr}=0$ and $$\frac{d}{dt}i_{dr} = 0.$$

Moreover, for the asynchronous machine, $L_d=L_s$ and $L_q=L_s-L_m^2/L_r$ where $L_s$ is the stator inductance is, $L_m$ is the mutual inductance, and $L_r$ is the rotor inductance.

Figure 4:
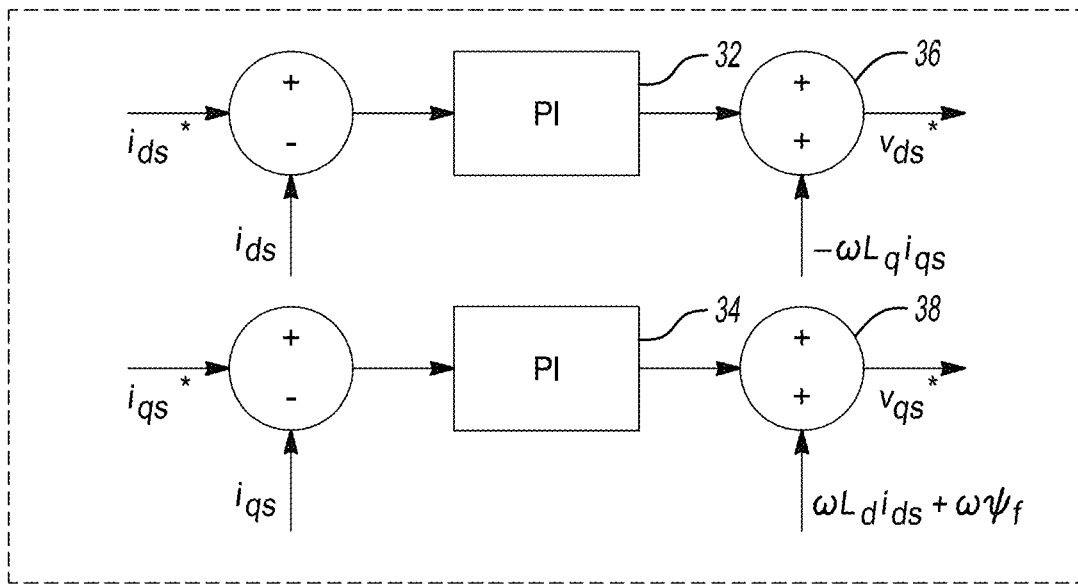
FIG. 4 is a block diagram of an another linear controller having feedforward compensation.

It follows from equations (5) and (6), above, that d and q axes are interdependent due to cross-coupling terms and therefore raise the challenge in designing the controllers. The most common solution is to add the feedforward compensation 36 and 38 at the outputs of the first and second current controllers 32 and 34, respectively, as shown in FIG. 4. Consequently, the equations (5) and (6) are approximated as $$v_{ds} = i_{ds}R_s + L_d\frac{di_{ds}}{dt}, \quad (7)$$

$$v_q = i_{qs}R_s + L_{qs}\frac{di_{qs}}{dt}. \quad (8)$$

Therefore, the d and q axes independent transfer functions of the electric motor are expressed as $$i_{ds}/v_{ds} = \frac{1/L_d}{\left(s + \frac{R_s}{L_d}\right)} \quad (9)$$

$$i_{qs}/v_{qs} = \frac{1/L_q}{\left(s + \frac{R_s}{L_q}\right)} \quad (10)$$

With reference to FIG. 5, a block diagram of the linear current controller along with machine model for the d axis is generally indicated by reference numeral 40. Considering that $v_{ds}=v^*_{ds}$, and $v_{qs}=v^*_{qs}$, the open loop transfer functions are $$\frac{i_{ds}}{\tilde{i}_{ds}} = \frac{K_{pd}\left(s + \frac{K_{id}}{K_{pd}}\right)}{s} \cdot \frac{1/L_d}{\left(s + \frac{R}{L_d}\right)} \quad (11)$$

$$\frac{i_{qs}}{\tau_{qs}} = \frac{K_{pq}\left(s + \frac{K_{iq}}{K_{pq}}\right)}{s} \frac{1/L_q}{\left(s + \frac{R}{L_q}\right)} \quad (12)$$

By the principle of pole-zero cancellation method, the following equalities $$\frac{K_{id}}{K_{pd}} = \frac{R}{L_d} \text{ and } \frac{K_{iq}}{K_{pq}} = \frac{R}{L_q}$$

are considered, and therefore equations (11) and (12) become $$\frac{i_{ds}}{\tau_{ds}} = \frac{K_{pd}/L_d}{s}, \quad (13)$$

$$\frac{i_{qs}}{\tau_{qs}} = \frac{K_{pq}/L_q}{s}. \quad (14)$$

Accordingly, the closed loop transfer functions become $$i_{ds}/i_{ds}^* = \frac{K_{pd}/L_d}{\left(s + \frac{K_{pd}}{L_d}\right)}, \quad (15)$$

$$i_{qs}/i_{qs}^* = \frac{K_{pq}/L_q}{\left(s + \frac{K_{pq}}{L_q}\right)}, \quad (16)$$

where $$\frac{K_{pd}}{L_d} = \omega_{bd} \text{ and } \frac{K_{pq}}{L_q} = \omega_{bq}$$

are the closed loop bandwidth of the system on d and q axes respectively. From the pole-zero cancellation equalities and the equations of $\omega_{bd}$ and $\omega_{bq}$, the current controller gains are derived as $$K_{pd} = \omega_{bd} L_d; \ K_{id} = \omega_{bd} R; \ K_{pq} = \omega_{bq} L_q; \ K_{iq} = \omega_{bq} R. \quad (17)$$

It is evident from equations (17) that the current controller gains can be tuned with the information of only $R_s$, $L_d$ and $L_q$.

Test Voltage Profile

Parameter estimation (e.g., online parameter estimation) for the commissioning of an electric motor in accordance with the teachings of the present disclosure includes the application of a common test voltage profile for both synchronous and asynchronous electric motors. With reference to FIG. 6, the test voltage profile 50 includes a DC profile portion 52 and an AC profile portion 54.

The test voltage of the DC profile portion 52 can begin at an initial value ($v_0$) and can ramp to a maximum value ($v_{max}$) at the end of the DC profile portion 52. The test voltage can ramp between $v_0$ and $v_{max}$ in any desired manner, but in the example illustrated ramps a constant rate (m). The voltage of the AC profile portion 54 can vary in a desired manner (e.g., sinusoidally), at a desired frequency with a desired amplitude. The test voltage profile 50 provides better control over current rise than applying a constant DC link voltage and therefore significantly reduces or eliminates the chances of thermal runaway of the electric motor or the inverter. The rate (m) at which the test voltage ramps in the DC profile portion 52 is preferably slow enough to allow sufficient time to monitor and control the high current.

The frequency of the AC profile portion 54 is preferably sufficiently high to create a correspondingly high frequency impedance in the electric motor 12 (FIG. 1) that can help to limit the current that flows through the electric motor 12 (FIG. 1) during the AC profile portion 54.

Significantly, the test voltage profile 50 helps to suppress the effects of other motor parameters (i.e., parameters that are not estimated in this stage of the commissioning process (hereinafter the "non-estimated parameters") on its response currents and thereby improving the accuracy of the estimating parameters.

For synchronous motors (both permanent magnet and field wound), the test voltage of the DC profile portion 52 is applied on the direct axis (d) while the rotor 18 (FIG. 1) is at standstill to estimate the resistance ($R_s$) of the stator 16 (FIG. 1). The test voltage of the DC profile portion 52 preferably ramps between $v_0$ and $v_{max}$ at a relatively slow rate to thereby suppress the influence of inductances on the current response. Moreover, the cross coupling terms disappear when the rotor 18 (FIG. 1) is at standstill. Therefore equation (5), above, can be approximated as $$v_{ds} = i_{ds} R_s. \quad (18)$$

High frequency AC excitations on the both the direct axis (d) and the quadrature axis (q) enhance the influences of only $L_d$ and $L_q$ for the synchronous motors. The resistance term can be neglected as it is very low as compared to the high frequency terms $$L_d \frac{di_{ds}}{dt} \text{ and } L_q \frac{di_{qs}}{dt}.$$

Therefore, equations (5) and (6) can be approximated for this case as $$v_{ds} = L_d \frac{di_{ds}}{dt}, \quad (19)$$

$$v_{qs} = L_q \frac{di_{qs}}{dt}. \quad (20)$$

The stator field orients to the rotor field for an asynchronous motor when the test voltage of the DC profile portion 52 is applied on the direct axis (d) while the rotor 18 (FIG. 1) is at standstill. Therefore, the field orientation condition $\psi_{qr} = 0$ is met. The rotor d axis voltage and flux linkage are expressed as $$0 = i_{dr} R_r + \frac{d\psi_{dr}}{dt}, \quad (21)$$

$$\psi_{dr} = L_r i_{dr} + L_m i_{ds} \quad (22)$$

The direct axis (d) current is derived from equations (21) and (22), and can be transformed to Laplace form as $$I_{dr}(s) = -\frac{\frac{L_m}{R_r}sI_{ds}(s)}{\frac{L_r}{R_r}s+1},\quad(23)$$

The stator current is a ramp for a ramp voltage excitation. If $i_{ds}=r_c t$, where $r_c$ is ramp slope and t is time, and by substituting $I_{ds}(s)=r_c/s^2$ and taking inverse Laplace, the rotor current $i_{dr}$ is expressed as $$i_{dr} = -\frac{L_m}{R_r}r_c\left(1 - e^{-\frac{R_r t}{L_r}}\right)\quad(24)$$

From equation (24), it is true that $i_{dr}$ becomes constant $$\left(=-\frac{L_m}{R_r}r_c\right)$$

after some period of time depending on the rotor time constant $L_r/R_r$.) Therefore, one of the rotor steady state conditions $$\left(\frac{d}{dt}i_{dr}=0\right)$$

to realize equations (5) and (6) is met when the test voltage of the DC profile portion 52 is applied on the direct axis (d).

The results of a MATLAB Simulink simulation for the stator current ($i_{ds}$) and the rotor current ($i_{dr}$) on the direct axis (d) are shown in FIGS. 7A and 7B, respectfully. In the simulation, the test voltage of the DC profile portion 52 is applied on the direct axis (d) of the asynchronous motor and the asynchronous motor has parameters that are detailed in the table below.

| DC Link Voltage | 55 V |
| Rated Power | 9 KW |
| Rated Current | 200 A |
| Peak Current | 500 A |
| Stator Resistance | 2.5 mΩ |
| Magnetizing Inductance | 20 mH |
| Stator/Rotor Leakage Inductance | 20 uH |
| Rotor Resistance | 1.75 mΩ |
| Number of Poles | 14 |

The other condition $i_{dr}=0$ is not true for this case. However, the additional rotor cross-coupling terms due to $i_{dr}\neq 0$ do not appear in (5) and (6) as long as the synchronous excitation frequency (ω) remains zero, which is true for non-rotating voltage excitation, for example, ramp voltage excitation at standstill. Therefore the direct axis (d) equation (5) by applying ramp voltage at ω=0 and considering $L_d=L_s$ is $$v_{ds} = i_{ds}R_s + L_s\frac{di_{ds}}{dt}\quad(25)$$

It is apparent from equation (25) that only the stator resistance ($R_s$) and the stator inductance ($L_s$) parameters have influence on the current response. However, the ramp voltage should be fast enough to achieve the sufficient rate of change of current to signify the stator inductance ($L_s$) in equation (25). The stator resistance ($R_s$) and the stator inductance ($L_s$) parameters are estimated together in the proposed estimation method.

The rotor steady state conditions to realize model equations (5) and (6) are not true for an asynchronous machine with high frequency pulsating AC voltage excitation. The rotor currents oscillate at the same frequency of the stator excitation. Therefore, the rotor terms appears on the voltage equations (5) and (6). The equation (5) with a nonrotating (pulsating) AC high frequency excitation becomes $$v_{ds} = i_{ds}R_s + L_s\frac{di_{ds}}{dt} + L_m\frac{di_{rd}}{dt},\quad(26)$$

The equation (26) contains rotor current which is not available to measure. Therefore, equation (26) is transformed in all stator variable form with substitution from equations (21) and (22) as $$v_{ds} = i_{ds}R_s + (L_s - L_m^2/L_r)\frac{di_{ds}}{dt} + R_r/L_r(L_s i_{ds} - \psi_{ds})\quad(27)$$

The stator flux linkage $\psi_{ds}$ in equation (27) is not directly available. Therefore it is found from the d axis stator equation as $$\psi_{ds}=\int v_{ds} - R_s i_{ds}dt,$$

and it is represented in a convenient form as $$\psi_{ds}=\hat{v}_{ds}-R_s\hat{i}_{ds},\quad(28)$$

where $\hat{v}_{ds}=\int v_{ds}dt$ and $\hat{i}_{ds}=\int i_{ds}dt$. By substituting (28) into (27), it is transformed into all measurable stator variables as $$v_{ds} = i_{ds}R_s + (L_s - L_m^2/L_r)\frac{di_{ds}}{dt} + R_r/L_r(L_s i_{ds} - \hat{v}_{ds} + R_s\hat{i}_{ds})\quad(29)$$

The stator resistance ($R_s$) and the stator inductance ($L_s$) parameters in equation (29) are known from the previous estimation associated with equation (25) and ramp voltage excitation. Once the known parameter terms are taken to right hand side of the equation (27) and augmented to $v_{ds}$, the augmented $v_{ds}'$ becomes $$v_{ds}' = -\frac{L_m^2}{L_r}\frac{di_{ds}}{dt} - \frac{R_r}{L_r}\hat{v}_{ds}\quad(30)$$

The leakage factor $$\frac{L_m^2}{L_r}$$

and the inverse of rotor time constant ($R_r/L_r$) in equation (30) can be estimated simultaneously by the proposed estimation method. Once the parameters are known the d and q axes inductances can be found subsequently.

The parameters $L_d$, $L_q$ and $R_s$ are sufficient to tune the current controllers for both synchronous and asynchronous motors as presented in the previous section. The rotor time constant ($L_r/R_r$) is required to estimate the slip to realize indirect field oriented control of the asynchronous motors.

Estimation Method

The estimation method of the present disclosure, which can be performed in an online manner, is based on nonlinear optimization where Newton minimization is chosen as the nonlinear optimization solver. The nonlinear optimization minimizes the cost function against the unknown parameters. The cost function is formed from the specially arranged voltage equations (18), (19), (20), (25), and (28). These voltage equations in discrete form expressed as a function of the parameters and response currents are $$v_{ds,k} = f_k(i_{ds,k}, i_{qs,k}, x_k)$$

where $x_k$ is the unknown parameter or a vector of unknown parameters. The cost function is formed as the squared two norm of the voltage equation with additional regularization terms as $$c = \|v_{ds,k} - f_k(i_{ds,k}, i_{qs,k}, x_k)\|^2 + [x_k - x_{k-1}]'K[x_k - x_{k-1}]$$

where $x_{k-1}$ is the initial value of the parameters or the value from the previous estimation. The regularization term is a matrix for more than one parameter or a single element for one parameter. For an instance as the case of synchronous motors, the regularization term is $k_1$ for estimating only $R_s$ and it is a matrix $[[k_1, 0], [0, k_2]]$ for estimating $L_d$ and $L_q$ together. The regularization term act as a filter and eliminates the ripples in estimation mainly caused by measurement noises. However higher values of regularization factors decreases the convergence time. The values of $k_1$ and $k_2$ can be either pre-tuned or auto-tuned in operation.

With reference to FIG. 8, an estimation technique for estimating $R_s$ for synchronous motors and for estimating $R_s$ and $L_s$ for asynchronous motors in accordance with the teachings of the present disclosure is schematically illustrated in flowchart form. The method begins at bubble 70 and progresses to block 72, where values for parameter X, the rate (m) of the voltage ramp and regulation factors k1 and k2 are set. The method progresses to block 74.

In block 74, the test voltage ($v_{ds,n}$) of the DC profile portion 52 for a sample number (n) is applied to the electric motor on the direct axis (d) and the current response ($i_{ds,n}$) is measured. The method proceeds to decision block 76.

In decision block 76, if the magnitude of the current response ($i_{ds,n}$) is greater than the current limit ($i_{limit}$), then the method proceeds to block 78, where the sample number (k) is reset to zero (i.e., k=0) and the rate (m) of the voltage ramp is decreased by a predetermined amount. The method loops back to block 74.

Returning to decision block 76, if the magnitude of the current response ($i_{ds,n}$) is not greater than the current limit ($i_{limit}$), then the method proceeds to block 80, where the parameter $x_n$ is estimated by a nonlinear optimization method. The method proceeds to decision block 82.

In decision block 82, the method determines if the value of parameter $x_n$ has converged sufficiently, for example by calculating if the absolute value of the difference between the present and previous value of the parameter x (i.e., $x_n$ and $x_{n-1}$) is less than a predetermined convergence threshold (i.e., $|x_n - x_{n-1}|$<predetermined convergence threshold). If the difference between the present and previous value of the parameter x (i.e., $x_n$ and $x_{n-1}$) is less than the predetermined convergence threshold, the method proceeds to bubble 84 and ends. If the absolute value of the difference between the present and previous value of the parameter x (i.e., $x_n$ and $x_{n-1}$) is not less than the predetermined convergence threshold in decision block 82, the method proceeds to block 86.

In block 86, the sample number (n) is incremented and the method can proceed to decision block 88, where the method determines if the present value of n exceeds a predetermined limit ($n_{limit}$). In effect, the method determines if the number of samples (n) has reached the predetermined limit ($n_{limit}$) before the value of the parameter has converged. If the present value of n does not exceed the predetermined limit ($n_{limit}$), the method loops back to block 74.

Returning to decision block 88, if the present value of n exceeds the predetermined limit ($n_{limit}$), the method proceeds to block 90, where the rate (m) of the voltage ramp is increased by a predetermined amount. The method proceeds to decision block 92.

In decision block 92, the method determines if the present value of the rate (m) of the voltage ramp exceeds a predetermined limit ($m_{limit}$). If the present value of the rate (m) of the voltage ramp does not exceed the predetermined limit ($m_{limit}$), the method loops back to block 74. Returning to decision block 92, if the present value of the rate (m) of the voltage ramp does exceed the predetermined limit ($m_{limit}$), which is an indication that that the value of the response current ($i_{ds}$) was not sufficient in the prior testing, the method proceeds to block 94.

In block 94, the method can decrease the regularization factor k1 by a predetermined amount and the method can loop back to block 74.

With reference to FIG. 9, an estimation technique for estimating $L_d$ and $L_q$ for synchronous motors, and for estimating the leakage factor ($L_m^2/L_r$) and the inverse of rotor time constant ($R_r/L_r$) for asynchronous motors in accordance with the teachings of the present disclosure is schematically illustrated in flowchart form. The method begins at bubble 100 and progresses to block 102, where values for parameter X, the amplitude (A) of the AC power, the frequency (f) of the AC power and regulation factors k1 and k2 are set. The method progresses to block 104.

In block 104, the test voltage ($v_{ds,n}$) of the AC profile portion 54 for sample number (n) is applied to the electric motor. More specifically, the test voltage ($v_{ds,n}$) is applied on both the direct axis (d) and the quadrature axis (q) if the electric motor is a synchronous motor, and is applied on the direct axis (d) if the electric motor is an asynchronous motor. The response currents $i_{ds,n}$ and $i_{qs,n}$ on the direct axis (d) and the quadrature axis (q), respectively, are measured. The method proceeds to decision block 106.

In decision block 106, the methodology determines if the absolute value of either of the response currents $i_{ds,n}$ and $i_{qs,n}$ exceeds a predetermined current limit ($i_{limit}$). If the absolute valve of either of the response currents $i_{ds,n}$ and $i_{qs,n}$ exceeds the predetermined current limit ($i_{limit}$), the method proceeds to block 108 where the amplitude (A) of the AC power is reduced by a predetermined amount. The method loops back to block 104.

Returning to decision block 106, if the absolute valve of either of the response currents ($i_{ds,n}$ and $i_{qs,n}$) does not exceed the predetermined current limit ($i_{limit}$), the method proceeds to block 110 where the parameter $x_n$ is estimated by a nonlinear optimization method. The method proceeds to decision block 112.

In decision block 112, the method determines if the value of parameter $x_k$ has converged sufficiently, for example by calculating if the absolute value of the difference between the present and previous value of the parameter x (i.e., $x_n$ and $x_{n-1}$) is less than a predetermined convergence threshold (i.e., $|x_n - x_{n-1}|$<predetermined convergence threshold). If the absolute valve of the difference between the present and previous value of the parameter x (i.e., $x_n$ and $x_{n-1}$) is less than the predetermined convergence threshold, the method proceeds to bubble 114 and ends. If the difference between the present and previous value of the parameter x (i.e., $x_n$ and $x_{n-1}$) is not less than the predetermined convergence threshold in decision block 112, the method proceeds to block 116.

In block 116, the sample number (n) is incremented and the method can proceed to decision block 118, where the method determines if the present value of n exceeds a predetermined limit ($n_{limit}$). In effect, the method determines if the number of samples has reached the predetermined limit ($n_{limit}$) before the value of the parameter has converged. If the present value of n does not exceed the predetermined limit ($n_{limit}$), the method loops back to block 104.

Returning to decision block 118, if the present value of n exceeds the predetermined limit ($n_{limit}$), the method proceeds to block 120, where the amplitude (A) of the AC power is increased by a predetermined amount. The method proceeds to decision block 122.

In decision block 122, the method determines if the present value of the amplitude (A) of the AC power exceeds a predetermined limit ($A_{limit}$). If the present value of the amplitude (A) of the AC power does not exceed the predetermined limit ($A_{limit}$), the method loops back to block 104. Returning to decision block 122, if the present value of the amplitude (A) of the AC power does exceed the predetermined limit ($A_{limit}$), which is an indication that that the value of one or both of the response currents ($i_{ds}$ and $i_{qs}$) was not sufficient in the prior testing, the method proceeds to block 124.

In block 124, the method can decrease the regularization factors k1 and k2 by a predetermined amount and the method can loop back to block 104.

Simulation Results—Asynchronous Motor

The simulations for online parameter estimation as a part of a self-commissioning process performed in accordance with the teachings of the present disclosure was carried out for an asynchronous electric motor having specifications that are reported in the table above.

FIG. 10A is a plot 150 showing the test voltage ($v_{ds,k}$) of the DC profile portion 52 (FIG. 6) as a function of the time of the test, while FIG. 10B is a plot 152 showing the response current ($i_{ds}$) as a function of the time of the test. The test voltage ($v_{ds,k}$) and the response current ($i_{ds}$) are on the direct axis (d). It can be observed from the two plots 150 and 152 that the response current ($i_{ds}$) rises slowly in accordance with slow rise in the voltage and hence facilitates monitoring and control to safeguard the motor and power converter. A plot 154 of the actual stator resistance ($R_s$) as a function of the time of the test is shown in FIG. 10C, as is the value 156 of an estimate for the stator resistance ($R_s$). A plot 158 of the actual stator inductance ($L_s$) as a function of the time of the test is shown in FIG. 10D, as is the value 160 of an estimate for the stator inductance ($L_s$).

FIG. 10E is a plot 162 showing the test voltage ($v_{ds,k}$) of the AC profile portion 54 (FIG. 6) as a function of the time of the test, while FIG. 10F is a plot 164 showing the response current ($i_{ds}$) as a function of the time of the test. The test voltage ($v_{ds,k}$) and the response current ($i_{ds}$) are on the direct axis (d). The relatively high frequency (f) of the AC profile portion 54 helps to create a correspondingly high frequency impedance in the electric motor that limits current rise on the direct axis (d) as is shown in FIG. 10F. A plot 166 of the actual leakage factor ($L_m^2/L_r$) as a function of the time of the test is shown in FIG. 10G, as is the value 168 of an estimate for the leakage factor ($L_m^2/L_r$). A plot 170 of the actual inverse of the rotor time constant ($R_r/L_r$) as a function of the time of the test is shown in FIG. 10H, as is the value 172 of an estimate for the rotor time constant ($R_r/L_r$).

Simulation Results—Synchronous Motor

The simulations for online parameter estimation as a part of a self-commissioning process performed in accordance with the teachings of the present disclosure was carried out for a synchronous electric motor having specifications that are reported in the table below.

| | |
|---|---|
| DC Link Voltage | 115 V |
| Rated Power | 15 KW |
| Rated Current | 200 A |
| Peak Current | 500 A |
| Stator Resistance | 6 mΩ |
| d Axis Inductance | 67 uH |
| q Axis Inductance | 170 uH |
| Permanent Magnet Flux Linkage | 0.024 mWb |
| Number of Poles | 8 |

FIG. 11A is a plot 180 showing the test voltage ($v_{ds,k}$) of the DC profile portion 52 (FIG. 6) as a function of the time of the test, while FIG. 11B is a plot 182 showing the response current ($i_{ds}$) as a function of the time of the test. The test voltage ($v_{ds,k}$) and the response current ($i_{ds}$) are on the direct axis (d). It can be observed from the two plots 180 and 182 that the response current ($i_{ds}$) rises slowly in accordance with slow rise in the voltage and hence facilitates monitoring and control to safeguard the motor and power converter. A plot 184 of the actual stator resistance ($R_s$) as a function of the time of the test is shown in FIG. 11C, as is the value 186 of an estimate for the stator resistance ($R_s$).

With reference to FIG. 11D, plots 190 and 192 of the test voltage ($v_{ds,k}$) of the AC profile portion 54 as a function of the time of the test as applied on the direct axis (d) and the quadrature axis (q), respectively, are shown. It will be appreciated that the plots 190 and 192 have an identical amplitude (A), an identical frequency (f) and are in phase with one another so as to appear in this drawing as a single plot. In FIG. 11E, a plot 194 (shown in solid line) of the response current ($i_{ds}$) on the direct axis (d) as a function of the time of the test and a plot 196 (shown in phantom line) of the response current ($i_{dk}$) on the quadrature axis (q) as a function of the time of the test are shown. The relatively high frequency (f) of the AC profile portion 54 (FIG. 6) helps to create a correspondingly high frequency impedance in the electric motor that limits current rise on the direct axis (d) and the quadrature axis (q) as is shown in FIG. 11E. With reference to FIG. 11F, actual inductances ($L_d$ and $L_q$) on the direct and quadrature (d, q) axes as a function of the time of the test, as well as estimates for the inductances ($L_d$ and $L_q$) on the direct and quadrature (d, q) axes are shown. Reference numeral 198 is a plot of the actual stator inductance ($L_d$) on the direct axis (d) as a function of the time of the test is shown, reference numeral 200 is a value of the estimate of the stator inductance ($L_d$) on the direct axis (d), reference numeral 202 is a plot of the actual stator inductance ($L_q$) on the quadrature axis (q) as a function of the time of the test is shown, and reference numeral 204 is a value of the estimate of the stator inductance ($L_q$) on the quadrature axis (q).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for commissioning an electric motor having a stator and a rotor, the electric motor being a synchronous electric motor or an asynchronous electric motor, the stator having a direct axis (d) and a quadrature axis (q), the method comprising:
   with the rotor in a non-rotating condition relative to the stator, applying a first test voltage signal ($v_{ds}$) to the direct axis (d) of the stator and responsively measuring a first response current ($i_{ds}$) on the direct axis (d) of the stator, wherein the first test voltage signal ($v_{ds}$) is a direct current signal that continuously increases between a first voltage ($v_0$) and a second voltage ($v_{max}$);
   determining at least a first motor parameter based on the first response current ($i_{ds}$);
   with the rotor in a non-rotating condition relative to the stator, applying a second test voltage signal ($v_{ds}$) to either a) the direct axis (d) of the stator or b) both the direct axis (d) and the quadrature axis (q) of the stator, and responsively measuring second and third response currents ($i_{ds}$ and $i_{qs}$) on the direct and quadrature axes (d and q), respectively, of the stator, wherein the second test voltage signal ($v_{ds}$) has a non-zero frequency (f) and an amplitude (A); and
   determining second and third motor parameters based on at least one of the second and third response currents ($i_{ds}$ and $i_{qs}$).

2. The method of claim 1, wherein the direct current signal of the first test voltage signal ($v_{ds}$) ramps at a constant rate between the first voltage ($v_0$) and the second voltage ($v_{max}$).

3. The method of claim 1, wherein the first test voltage signal ($v_{ds}$) has a magnitude equal to the first voltage ($v_0$) when the first test voltage signal ($v_{ds}$) is initially applied to the direct axis (d) of the stator.

4. The method of claim 1, wherein the first test voltage signal ($v_{ds}$) has a magnitude equal to the second voltage ($v_{max}$) just before the first test voltage signal ($v_{ds}$) is halted.

5. The method of claim 1, wherein the at least the first motor parameter comprises a resistance ($R_s$) of the stator.

6. The method of claim 5, wherein the at least the first motor parameter further comprises an inductance ($L_s$) of the stator.

7. The method of claim 1, wherein the second and third motor parameters comprise an inductance ($L_d$) on the direct axis (d) and an inductance ($L_q$) on the quadrature axis (q), respectively.

8. The method of claim 1, wherein the second and third motor parameters comprise a leakage factor ($L_m^2/L_r$) and a parameter that is related to the inverse of a rotor time constant ($R_r/L_r$), respectively.

9. An electric motor drive system comprising:
   an electric motor having a stator and a rotor, the electric motor being a synchronous electric motor or an asynchronous motor, the stator having a direct axis (d) and a quadrature axis (q);
   a control unit having a power converter, control hardware and a control program that is executed by the control hardware, the control program being programmed to operate a self-commissioning algorithm that includes:
     applying a first test voltage signal ($v_{ds}$) to the direct axis (d) of the stator and responsively measuring a first response current ($i_{ds}$) on the direct axis (d) of the stator with the rotor in a non-rotating condition relative to the stator, wherein the first test voltage signal ($v_{ds}$) is a direct current signal that continuously increases between a first voltage ($v_0$) and a second voltage ($v_{max}$);
     determining at least a first motor parameter based on the first response current ($i_{ds}$);
     applying a second test voltage signal ($v_{ds}$) to either a) the direct axis (d) of the stator or b) both the direct axis (d) and the quadrature axis (q) of the stator when the rotor is in a non-rotating condition relative to the stator, and responsively measuring second and third response currents ($i_{ds}$ and $i_{qs}$) on the direct and quadrature axes (d and q), respectively, of the stator, wherein the second test voltage signal ($v_{ds}$) has a non-zero frequency (f) and an amplitude (A); and
     determining second and third motor parameters based on at least one of the second and third response currents ($i_{ds}$ and $i_{qs}$).

10. The electric motor drive system of claim 9, wherein the direct current signal of the first test voltage signal ($v_{ds}$) ramps at a constant rate between the first voltage ($v_0$) and the second voltage ($v_{max}$).

11. The electric motor drive system of claim 9, wherein the first test voltage signal ($v_{ds}$) has a magnitude equal to the first voltage ($v_0$) when the first test voltage signal ($v_{ds}$) is initially applied to the direct axis (d) of the stator.

12. The electric motor drive system of claim 9, wherein the first test voltage signal ($v_{ds}$) has a magnitude equal to the second voltage ($v_{max}$) just before the first test voltage signal ($v_{ds}$) is halted.

13. The electric motor drive system of claim 9, wherein the at least the first motor parameter comprises a resistance ($R_s$) of the stator.

14. The electric motor drive system of claim 13, wherein the at least the first motor parameter further comprises an inductance ($L_s$) of the stator.

15. The electric motor drive system of claim 9, wherein the second and third motor parameters comprise an inductance ($L_d$) on the direct axis (d) and an inductance ($L_q$) on the quadrature axis (q), respectively.

16. The electric motor drive system of claim 9, wherein the second and third motor parameters comprise a leakage factor ($L_m^2/L_r$) and a parameter that is related to the inverse of a rotor time constant ($R_r/L_r$), respectively.

* * * * *